United States Patent [19]
Wyse

[11] 3,962,017
[45] June 8, 1976

[54] PLASTIC FILM SEALER

[75] Inventor: Harold G. Wyse, Dayton, Ohio

[73] Assignee: Gad-Jets, Inc., Dayton, Ohio

[22] Filed: Nov. 10, 1972

[21] Appl. No.: 305,537

[52] U.S. Cl.................................. 156/306; 53/39; 53/285; 93/DIG. 1; 156/323; 156/583; 219/243
[51] Int. Cl.².................... C09J 5/00; B32B 31/20; B30B 15/34
[58] Field of Search........... 156/289, 306, 323, 583, 156/579; 53/39, 285, 33; 93/DIG. 1; 219/241, 244, 243

[56] References Cited
UNITED STATES PATENTS

| | | | |
|---|---|---|---|
| 2,556,008 | 6/1951 | Spalding | 219/243 |
| 2,638,964 | 5/1953 | Andina | 100/93 P |
| 2,842,910 | 7/1958 | Reed | 53/33 |
| 2,904,100 | 9/1959 | Fener | 156/583 |
| 2,936,816 | 5/1960 | Lang | 156/583 X |
| 3,059,690 | 10/1962 | Nyborg | 156/498 |
| 3,106,630 | 10/1963 | Klamp | 156/583 X |
| 3,115,731 | 12/1963 | Blythe et al | 156/583 X |
| 3,593,000 | 7/1971 | Forma | 219/243 |
| 3,657,055 | 4/1972 | Nichols | 156/583 |

OTHER PUBLICATIONS

"Polyimide Film," Modern Plastics Encyclopedia, vol. 46, No. 10A (Oct. 1969), p. 371.

*Primary Examiner*—William A. Powell
*Assistant Examiner*—J. J. Gallagher
*Attorney, Agent, or Firm*—Biebel, French & Nauman

[57] ABSTRACT

A plastic film sealer has a thermostatically controlled heated bar which can move inwardly and outwardly through an opening in the sealer housing. A high temperature plastic film is attached across the opening and interposed between the heated bar and the layers of heat sealable plastic film being heat sealed. The movement of the heated bar and of the high temperature plastic film is limited substantially to perpendicular movement relative to the plane of the heat sealable plastic film layers.

11 Claims, 5 Drawing Figures

PLASTIC FILM SEALER

BACKGROUND OF THE INVENTION

This invention relates to plastic film sealing apparatus, and more particularly to a method and apparatus for effecting a thermal union among layers of heat sealable plastic film.

One common method for joining layers of heat sealable plastic films involves bringing a heated sealing bar into engagement with the plastic film layers. The heated bar melts the plastic and the pressure of the bar against the melted plastic forms a thermal weld at that point. When the proper bar temperature, sealing pressure, and weld time are employed, a good seal between the layers of the heat sealable plastic film is produced. Where the above parameters of temperature, pressure, and time can be standardized, this packaging method has proven especially useful in mass production applications, where the films may be used for packaging any of a wide variety of products.

The use of heat sealable plastic films in less standardized applications, however, has been somewhat retarded due to the relatively close tolerances which must be maintained with the above three parameters. Truly practical machines for small commercial and/or domestic users have not been feasible due in part to the great difficulties and expense, in mass production, of trying to adjust the heater thermostats closely enough to ensure consistently good results. Another limitation, for example in food store applications, has arisen where different types and thicknesses of plastic films are regularly encountered, where different numbers of layers of film are to be joined, where sealing times, pressures, and temperatures must therefore vary, where heated bar temperature stability and temperature uniformity are accordingly difficult to maintain, and so on.

In cases such as these, heat sealable plastic films have not provided the same convenience and economies found in the larger scale, more standardized operation. If the bar is too hot the films sag or melt through, follow the bar down as it is retracted, thus extending, thinning, and breaking into holes, or stick to the bar. If the bar is too cold there is no seal. If the temperature is non-uniform the seal is unacceptable. In commercial applications, the frequent trial runs and stabilization delays required for every change in the sealing operation too often outweigh the benefits afforded.

SUMMARY OF THE INVENTION

Briefly, this invention provides a high temperature non-wetting plastic film interposed between the heated bar of a plastic film sealing apparatus and the layers of heat sealable plastic film which are to be joined. The heated bar is moved against the high temperature plastic film, which, being constrained against lateral movement, is in turn pressed perpendicularly against the layers of the heat sealable plastic film, to effect a thermal union among the latter.

The high temperature plastic film furnishes support for the softened heat sealable plastic films, prevents them from sagging or sticking to the heated bar, moderates the transfer of heat from the bar to the sealable films, diffuses the heat slightly, compensates for non-uniform bar temperatures, prevents shifting and separation of the heat sealable film layers, supports the films until they can again cool and solidify, and ultimately provides a superior weld among the heat sealable films. In practice, the use of the high temperature plastic film has allowed a wide variety of thicknesses of heat sealable plastic films to be joined, in various numbers, while the bar itself is kept at substantially one uniform temperature. Also, the range of weld application times is extended, making control of the application time itself less critical.

It is therefore an object of this invention to provide a method and apparatus for sealing layers of heat sealable plastic film; an apparatus having a high temperature plastic film interposed between a heated bar and the layers of heat sealable plastic film to be joined; an apparatus and method allowing a variety of combinations of numbers and thicknesses of heat sealable plastic films to be joined at substantially the same bar temperature; an apparatus and method yielding acceptable thermal unions among layers of heat sealable plastic films within a relatively broad range of application times; and to accomplish all of the above objects and purposes in an inexpensive, uncomplicated, and highly efficient method and apparatus readily applicable to a wide variety of plastic film sealing applications.

Other objects and advantages of the invention will be apparent from the following description, the accompanying drawings and the appended claims.

DESCRIPTION OF THE PREFERRED EMBODIMENT

Figure 1:
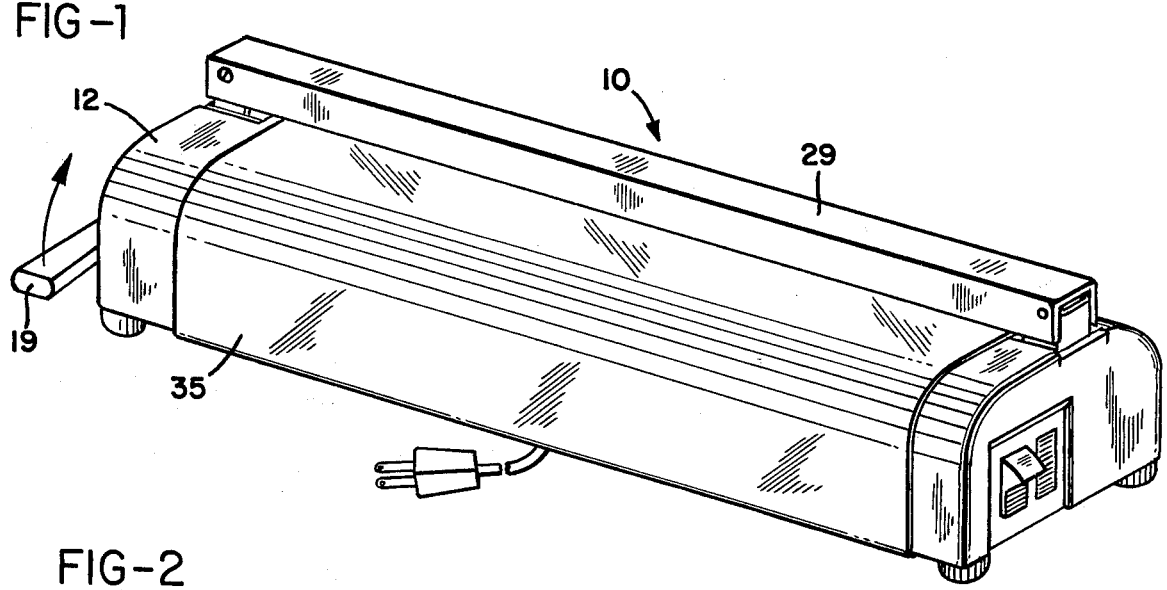
FIG. 1 is a perspective view of a plastic film sealer constructed according to this invention.
Figures 2, 3:
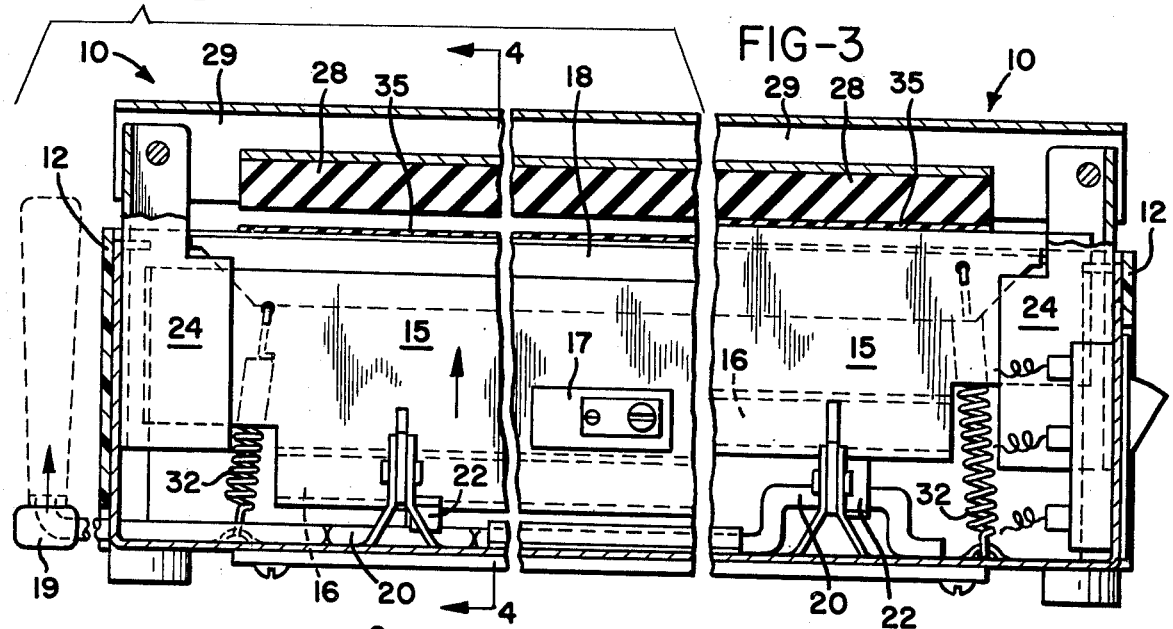
FIG. 2 is a partial vertical cross sectional view of the film sealer of FIG. 1 taken on line 2—2 of FIG. 4, and showing the heated bar in the lowered or rest position.
FIG. 3 is a partial cross sectional view similar to FIG. 2, showing the heated bar in the raised or sealing position.
Figure 4:
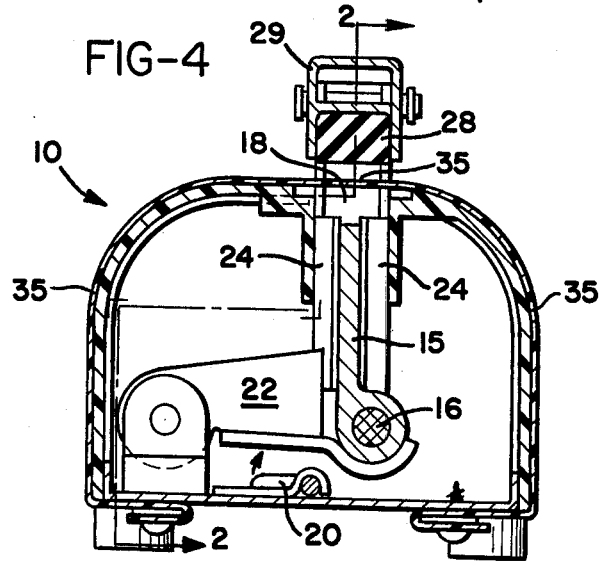
FIG. 4 is a cross sectional view of the FIG. 1 apparatus taken on line 4—4 of FIG. 2.

With reference to the drawings, and more particularly to FIG. 1, there is illustrated a plastic film sealer 10 constructed according to the present invention.

Sealer 10 includes a housing 12 enclosing a heated bar 15. Bar 15 is heated by means of a heating element 16 controlled by a thermostat 17.

Figure 5:
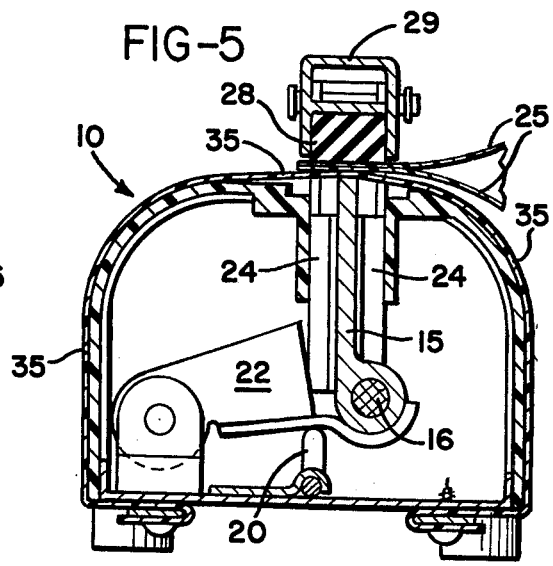
FIG. 5 is a cross sectional view of the FIG. 1 apparatus similar to FIG. 4, but showing the bar in the raised position of FIG. 3 and showing the joining of two layers of heat sealable plastic film.

Bar 15 is mounted within housing 12 for upward and downward movement inwardly and outwardly of an opening 18 in the top of housing 12. The movement of bar 15 is in response to an appropriate raising and lowering means, which, for purposes of illustration, is shown as a rotatable handle 19 connected to a crank arm 20 which engages levers 22 to lift bar 15. The vertical movement of bar 15, in turn, is guided by means of vertical guides 24 to bring the heated bar 15 vertically into thermal engagement with the layers of the heat sealable plastic films 25 (FIG. 5) which are to be sealed. The vertical guides 24 restrain bar 15 from lateral movement, assuring that the movement will be substantially perpendicular to the plane of the heat sealable plastic films 25.

The plastic films 25 are backed up opposite heated bar 15 by a silicone foam rubber pad 28 mounted within a clamp bar 29 opposite the opening 18. The heated bar 15 is maintained momentarily in thermal engagement with the plastic films 25, the duration being appropriate to the task at hand, after which handle 19 is returned to the down position and return springs 32 retract bar 15 at least to the point where the springs are again relaxed.

The bonding pressure of bar 15 against the films 25 is controlled by the resiliency of the silicone foam rubber pad 28, and is thus a relatively stable parameter in the illustrated embodiment. Conventional means may be provided, of course, to make the pressure variable according to the particular applications desired.

A high temperature non-wetting or non-sticking support 35, which melts or breaks down at temperatures substantially above the thermostatically regulated temperatures of heated bar 15, and hence well above the melting temperature of the heat sealable films 25, is disposed between bar 15 and the heat sealable films 25. Support 35, preferably a high temperature plastic film is mounted on the sealer 10 independently of the heated bar and enables the film sealer to join a variety of combinations of numbers and thicknesses of heat sealable plastic films without the need to change or readjust the temperature of bar 15, and without the need for critical control of the length of time of application of bar 15 to the plastic films.

The high temperature plastic film 35 is restrained against lateral movement by mounting the film 35 about the entire upper exterior of the housing 12. Film 35 is thus limited substantially to perpendicular movement only, relative to the plane of the films 25 adjacent bar 15, so that both bar 15 and film 35 will not shift horizontally and tear or separate the melted films 25.

In operation, this invention has proven quite successful when bar 15 was maintained at a temperature range of approximately 270°F to 300°F and when a high temperature plastic film 35 of Teflon or Kapton, approximately 0.001 to 0.005 inch in thickness, was employed. The high temperature plastic film furnishes support for the heat softened films 25, prevents them from sagging, separating, or sticking to bar 15, and allows the subsequently cooled and joined films 25 to be separated easily from the sealer 10.

This invention has been able to effect high quality thermal unions among a wide variety of combinations of numbers and thicknesses of heat sealable plastic films, such as the joining of layers of two films and four films, four and four, two and sixteen, and so on, all at substantially the same bar temperatures mentioned above, and within a relatively broad range of application times. Somewhat longer application times have been required, of course, since the high temperature plastic film 35 delays the movement of heat to the films 25 and also spreads the heat slightly.

As may be seen, therefore, this invention has numerous advantages. It may be incorporated into a wide variety of heat sealing devices using any appropriate means for bringing the heated bar, such as bar 15, against the heat sealable plastic films which are to be joined. In all such cases, the interposition of an appropriate supporting film 35 between the heated bar and the heat sealable plastic films enables the thermal union among the heat sealable films to be effected without critical regard to the number of film thicknesses involved, the temperature of the bar, and the length of time of the heat application.

Since this invention enables such a wide combination of heat sealable plastic films to be joined without critical regard to the precise thermostat setting, it is particularly useful both for inexpensive mass production of domestic type sealing machines, and in those applications which previously required frequent and arduous readjustment of the heated bar temperature and the heat application time. Thus, where domestic machines are concerned, where short commercial runs are involved, or where frequent changes must be made, this invention provides a substantial improvement over the methods and apparatus heretofore available.

While the method herein described, and the form of apparatus for carrying this method into effect, constitute preferred embodiments of this invention, it is to be understood that the invention is not limited to this precise method and form of apparatus, and that changes may be made in either without departing from the scope of the invention.

What is claimed is:

1. In an apparatus for thermally joining a plurality of layers of heat sealable plastic film, including a heated bar which includes heating element means, said heated bar being movable upwardly into momentary thermal engagement with the layers of heat sealable plastic film to effect a thermal union thereamong, the improvement comprising:
   a. a high temperature supporting film mounted independently of the heated bar and interposed between the bar and the plastic film layers to support the films in order to prevent them from sagging and from following the downward movement of the heated bar, the supporting film enabling a variety of combinations of numbers and thicknesses of heat sealable plastic films to be joined at substantially the samd heated bar temperature, and within a relatively broad range of heat application times,
   b. a clamp opposite said high temperature supporting film for backing up the heat sealable plastic film layers when said heated bar is moved upwardly into thermal engagement therewith, and
   c. a resilient elastomeric pad mounted in said clamp for engaging the heat sealable plastic films opposite said heated bar and high temperature film, the resiliency of said pad determining the bonding pressure applied to the heat sealable plastic film layers as they are clamped between said high temperature supporting film and said pad in said clamp.

2. The apparatus of claim 1 including means for restricting said high temperature supporting film to movement which is substantially perpendicular to the plane of the heat sealable plastic films adjacent the heated bar.

3. The apparatus of claim 1 including means for restricting the heated bar to movement which is substantially perpendicular to the plane of the heat sealable plastic films adjacent the heated bar.

4. The apparatus of claim 1 including means for restricting said heated bar and said high temperature supporting film to movement which is substantially perpendicular to the plane of the heat sealable plastic films adjacent said heated bar.

5. In an apparatus for thermally joining a plurality of layers of heat sealable plastic film, including a heated bar which includes heating element means, said heated bar being movable upwardly and downwardly from a position beneath the films upwardly into momentary thermal engagement with the film layers to effect a pressurized thermal union thereamong, the improvement comprising:
a. means supporting the heat sealable plastic films independently of the bar and generally in the region of thermal contact between the heated bar and the layers of heat sealable plastic film, to support the films in order to prevent them from sagging and from following the downward movement of the bar,
b. a clamp opposite said film supporting means for backing up the heat sealable plastic film layers when said heated bar is moved upwardly into thermal engagement therewith, and
c. a resilient elastomeric pad mounted in said clamp for engaging the heat sealable plastic films opposite said heated bar and said film supporting means, the resiliency of said pad determining the bonding pressure applied to the heat sealable plastic film layers as they are clamped between said film supporting means and said pad in said clamp.

6. The apparatus of claim 5 wherein said support means is a high temperature plastic film.

7. The apparatus of claim 6 including means for restricting the heated bar and said high temperature film to movement which is substantially perpendicular to the plane of the heat sealable plastic films adjacent the heated bar.

8. An apparatus for thermally joining a plurality of layers of heat sealable plastic film, comprising:
a. a housing,
b. means defining an elongated opening through the top of said housing,
c. a heated bar within said housing, said heated bar including heating element means and being movable upwardly through said opening and outwardly of said housing,
d. vertical guides for guiding the heated bar into vertical movement and restraining the bar from lateral movement,
e. lever means pivoted to said housing and engaging said heated bar on the bottom thereof for controllably moving said heated bar inwardly and outwardly through said opening,
f. a crank arm for engaging and lifting said lever means upon rotation of said crank arm,
g. a rotatable handle connected to said crank arm for rotating said crank arm,
h. a high temperature supporting film attached to said housing across said opening to interpose said supporting film between said heated bar and the layers of heat sealable plastic film when said layers of heat sealable plastic film are placed across said opening to support the films in order to prevent them from sagging and from following the downward movement of the heated bar, the supporting film enabling a variety of combinations of numbers and thicknesses of the heat sealable plastic films to be joined at substantially the same bar temperature and with a relatively broad range of heat application times, when said heated bar is moved upwardly into momentary thermal engagement with the layers of heat sealable plastic film,
i. a clamp opposite said high temperature supporting film for backing up the heat sealable plastic film layers when said heated bar is moved upwardly into thermal engagement therewith, and
j. a resilient elastomeric pad mounted in said clamp for engaging the heat sealable plastic films opposite said heated bar and high temperature film, the resiliency of said pad determining the bonding pressure applied to the heat sealable plastic film layers as said handle is rotated to raise said heated bar to clamp said heat sealable plastic films between said high temperature supporting film and said pad in said clamp.

9. A method for thermally joining a plurality of layers of heat sealable plastic film, comprising:
a. interposing a high temperature supporting film above a heated bar and beneath the plastic film layers, the heated bar including heating element means,
b. moving the heated bar upwardly into momentary thermal engagement with the high temperature supporting film and the plastic film layers to effect a thermal union among the heat sealable plastic films, the high temperature supporting film supporting the heat sealable plastic films independently of the downward movement of the bar in order to prevent them from sagging and following the downward movement of the bar, the supporting film thus enabling a variety of combinations of numbers and thicknesses of heat sealable plastic films to be joined at substantially the same bar temperature, and within a relatively broad range of heat application times, and
c. backing up the heat sealable plastic film layers with a resilient elastomeric pad opposite the high temperature supporting film to control the bonding pressure applied to the heat sealable plastic film layers according to the resiliency of the pad as they are clamped between the high temperature supporting film and the pad as the heated bar is moved upwardly into thermal engagement therewith.

10. The method of claim 9 wherein the heated bar is restrained against lateral movement.

11. The method of claim 9 wherein the high temperature supporting film is restrained against lateral movement.

* * * * *